United States Patent
Kakuta et al.

(10) Patent No.: US 8,858,677 B2
(45) Date of Patent: Oct. 14, 2014

(54) METHOD AND APPARATUS FOR RECOVERING VALUABLE SUBSTANCE FROM LITHIUM SECONDARY BATTERY

(75) Inventors: Toshiya Kakuta, Tokyo (JP); Seiichiro Yamazaki, Narita (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 1372 days.

(21) Appl. No.: 12/084,705

(22) PCT Filed: Feb. 2, 2006

(86) PCT No.: PCT/JP2006/301765
§ 371 (c)(1),
(2), (4) Date: May 8, 2008

(87) PCT Pub. No.: WO2007/088617
PCT Pub. Date: Aug. 9, 2007

(65) Prior Publication Data
US 2009/0229413 A1    Sep. 17, 2009

(51) Int. Cl.
*C22B 26/12* (2006.01)
*C22B 1/00* (2006.01)
*C25C 3/02* (2006.01)

(52) U.S. Cl.
USPC ............................ 75/402; 205/407; 204/243.1

(58) Field of Classification Search
USPC ............................ 75/402; 205/407; 204/243.1
See application file for complete search history.

(56) References Cited

U.S. PATENT DOCUMENTS 3,999,984 A * 12/1976 Kawai .............................. 420/21
4,053,305 A * 10/1977 Smyres et al. ................. 205/569
5,888,463 A * 3/1999 McLaughlin et al. ....... 423/179.5
6,150,050 A * 11/2000 Mathew et al. .................. 429/49
2003/0121366 A1 * 7/2003 Tateiwa et al. .................. 75/401
2005/0241943 A1   11/2005 Kakuta et al.

FOREIGN PATENT DOCUMENTS

| JP | A-10-008150 | 1/1998 |
|---|---|---|
| JP | A-10-158751 | 6/1998 |
| JP | A-10-223264 | 8/1998 |
| JP | A-10-241750 | 9/1998 |
| JP | A-10-255862 | 9/1998 |
| JP | A-10-287864 | 10/1998 |
| JP | A-10-330855 | 12/1998 |
| JP | A-11-097076 | 4/1999 |
| JP | A-11-242967 | 9/1999 |
| JP | 2000 348782 A | 12/2000 |
| JP | A-2000-348782 | 12/2000 |

(Continued)

*Primary Examiner* — Rebecca Lee
(74) *Attorney, Agent, or Firm* — Oliff PLC

(57) ABSTRACT

A valuable-substance recovery method according to the present invention includes: a solvent peeling step (S3) of dissolving a resin binder included in an electrode material by immersing crushed pieces of a lithium secondary battery into a solvent, so as to peel off the electrode material containing valuable substances from a metal foil constituting the electrode; a filtering step (S4) of filtering a suspension of the solvent, so as to separate and recover the electrode material containing the valuable substances and a carbon material; a heat treatment step (S5) of heating the recovered electrode material containing the valuable substances and the carbon material, under an oxidative atmosphere, so as to burn and remove the carbon material; and a reducing reaction step (S6) of immersing the resultant electrode material containing the valuable substances into a molten salt of lithium chloride containing metal lithium, so as to perform a reducing reaction.

17 Claims, 12 Drawing Sheets

(56) References Cited

FOREIGN PATENT DOCUMENTS

| JP | A-2001-115218 | 4/2001 |
| JP | A-2001-185241 | 7/2001 |
| JP | A-2003-157913 | 5/2003 |
| JP | A-2003-206132 | 7/2003 |
| JP | A-2003-272720 | 9/2003 |
| JP | A-2005-011698 | 1/2005 |
| JP | A-2005-042189 | 2/2005 |

* cited by examiner

| WEIGHT RATIOS OF COMPONENTS CONSTITUTING THE BATTERY PACKAGE (wt%) | | | |
|---|---|---|---|
| RESIN CASE | 16 | | |
| IC, etc. | 6 | | |
| CASE (METALLIC) | 22 | | |
| FILM | 6 | | |
| POSITIVE ELECTRODE | 27 | $LiCoO_2$ | 21 |
| | | AL FOIL | 5 |
| | | BINDER | 1 |
| NEGATIVE ELECTRODE | 23 | CARBON | 13 |
| | | Cu FOIL | 9 |
| | | BINDER | 1 |
| TOTAL | 100 | | |

METHOD AND APPARATUS FOR RECOVERING VALUABLE SUBSTANCE FROM LITHIUM SECONDARY BATTERY

TECHNICAL FIELD

The present invention relates to a recovery method and a recovery apparatus for recovering valuable substances, such as lithium (Li), cobalt (Co) and the like, from lithium secondary batteries.

BACKGROUND ART

For electrode materials of the lithium secondary batteries, oxides of lithium-containing transition metals are used, and in particular, composite materials of lithium cobaltate ($LiCoO_2$) and carbon (C) are used. These composite materials can be synthesized relatively easily. As other electrode materials (or positive electrode materials) of the lithium secondary batteries, for example, $LiNiO_2$, $LiCo_xNi_{(1-x)}O_2$ (x=1~0), $LiMn_2O_4$ and the like can be mentioned.

As described above, since the electrode materials (or positive electrode materials) of the lithium secondary batteries contain rare and valuable substances, such as cobalt compounds, lithium compounds and/or the like, it is desired to recover such valuable substances from used lithium secondary batteries. Namely, the recovered valuable substances can be recycled and used again, for example, as the electrode materials for the lithium secondary batteries.

In the past, recycling of the positive electrode materials generally employs a wet process, in order to recover the cobalt compounds and the like, through several steps of processing oxides.

For example, in the recovery method for the valuable metals described in JP 10-287864 A, an eluate is separated by adding mineral acid, such as hydrochloric add or sulfuric acid, or a mixture of the mineral acid and aqueous hydrogen peroxide to active materials used for the positive electrode of the lithium secondary battery. Thereafter, the resultant eluate is extracted and separated into desired components by contacting it with a solvent containing a special metal extractant, such as bis(1,1,3,3-tetramethylbutyl)phosphinic add compounds and the like, and a solvent phase of the so-obtained extract is then contacted with the mineral acid for back extraction and separation, thereby recovering the valuable metals.

As described above, the steps of processing oxides in the conventional recovery method for the valuable metals include multi-stage steps, such as acid dissolution, solvent extraction, precipitation, acid treatment, heat treatment and the like, as such requiring relatively complex and large-sized processing equipment as well as a higher processing temperature and a longer processing time.

In fact, in the case of recovering cobalt (Co) that is one of the valuable metals from the lithium secondary battery by using the equipment employing the wet process (or aqueous process), a large-sized plant and higher production cost should be required. Therefore, it is necessary for commercial profit to process a quite great amount of lithium secondary batteries. Currently, Co is a by-product of nickel (Ni), and is collected, as such a by-product, by mixing Ni ore, which is usually employed as a main raw material, with disposed lithium secondary batteries and then processing the mixture by utilizing existent equipment for refining (or collecting) Ni and Co from the Ni ore. Thus, it has not been considered so far commercially practical to operate such wet process equipment in order to process only the disposed lithium secondary batteries as the main raw material.

In the recovery method for recovering the valuable metals from the used lithium secondary batteries, described in JP 10-158751 A, the used lithium secondary batteries are first calcinated, and then reduced with carbon, so as to be brought into a state likely to be changed into metal condensate, such as cobalt metal powder particles, nickel metal powder particles or the like. Thereafter, the calcinated material is ground, screened, and separated into a part rich in the valuable metals and a part containing a lower content of the valuable metals. Subsequently, the condensate of the valuable metals is mixed with a calcium compound, and the resultant mixture is heated and melted at 1500° C. or higher temperature, so as to cause aluminum components to be incorporated and removed into slag of the calcium compound. In this way, the valuable metals, such as cobalt, nickel and the like, can be recovered.

However, in the conventional recovery method described above, it is quite difficult to effectively collect lithium that is one of the valuable metals. In addition, in the case of processing the electrode material in which other rare and valuable components are also contained, there is a need for employing separate processing methods respectively suitable for collecting such metal components.

To address such problems of the conventional recovery methods, JP 2005-11698 A, filed by applicants including the applicant of the current application as one of the co-applicants thereof, discloses a method and an apparatus for recycling the electrode materials of the lithium secondary batteries, in which a recycling process can be performed, with simpler steps and in a shorter time, as compared with the conventional methods as previously known. According to this recycling method and apparatus, the recovery or collection of lithium can be performed more appropriately than the conventional recovery methods in which such recovery was quite difficult.

Specifically, in the recycling method and apparatus described in JP 2005-11698 A, lithium cobaltate ($LiCoO_2$), the positive electrode material of the lithium secondary battery, is subjected to a reducing reaction in molten lithium chloride (LiCl) together with metal lithium (Li) (i.e., in a reducing reaction step). Consequently, lithium oxide ($Li_2O$) is produced, while cobalt oxide (CoO), cobalt (Co) and the like are precipitated and then separated. Thereafter, the lithium oxide ($Li_2O$) is electrolyzed in the molten lithium chloride, and metal lithium (Li) will be deposited onto and collected from a cathode. As described above, the recycling method and apparatus employ a Li—LiCl process as a main process thereof.

One example of components (weight ratios) constituting the lithium secondary battery is shown in FIG. 14. Additionally, one example of an electrode structure of the lithium secondary battery is shown in FIG. 15. A film (or separator), the positive electrode and negative electrode, respectively shown in FIG. 14, correspond together to an electrode portion 40 shown in FIG. 15, and such a sheet of the electrode portion 40 is wound around a core to form each electrode of the battery. As shown in FIG. 15, in the electrode portion 40 of the lithium secondary battery, the positive electrode 41 and the negative electrode 42 are separated from each other by the film 43 as the separator.

The positive electrode 41 is formed by attaching lithium cobaltate ($LiCoO_2$) powder 44 to both faces of an aluminum (Al) foil 45, wherein the $LiCoO_2$ powder 44 is molded together with a fluororesin binder (i.e., polyvinylidene fluoride: PVdF). On the other hand, the negative electrode 42 is formed by attaching carbon black powder 46 to both faces of a copper (Cu) foil 47, wherein the carbon black powder 46 is molded together with a resin binder.

In the recycling method described above, since the Li—LiCl process is employed as the main process, it has been found that, if pre-treatment steps and/or post-treatment steps that have been employed in the conventional wet process are applied to this method, the following various problems will occur.

Namely, if the Al foil used as the electrode material of the lithium secondary battery is incorporated, AlCo alloys and/or other intermetallic compounds will be produced, leading to deterioration of purity of recovered Co. Namely, in the positive electrode of the lithium secondary battery, the lithium cobaltate powder is molded together with the fluororesin binder (i.e., polyvinylidene fluoride: PVdF) and attached to the Al foil. As such, if a heat treatment is provided while the lithium cobaltate powder and the Al foil are contacted with each other, AlCo oxides will be produced and then reduced in the main process (i.e., the Li—LiCl process). Therefore, the AlCo alloys and/or other intermetalic compounds as described above will be produced.

However, in the conventional wet process (or aqueous process), the incorporation of such AlCo alloys or the like will not be problematic because these products can be dissolved in acids employed therein. Instead, the production of the AlCo alloys or the like will be problematic when the molten salt process (i.e., the Li—LiCl process), rather than the aqueous process, is employed as the main process.

In addition, when the fine powder of carbon, one of the materials constituting the negative electrode of the lithium secondary electrode, is incorporated, Li will be wasted because of reaction of the carbon with Li necessary for use in a Li reduction reaction, leading to disadvantage in the cost. This is because oxygen necessary for burning and removing the carbon black will not be sufficiently contacted with the carbon black in an ordinary combustion process, as such the carbon black constituting the negative electrode may tend to remain intact.

Additionally, when the fluororesin binder, one of the electrode materials of the lithium secondary electrode, is incorporated, Li will be wasted because of reaction of the fluororesin with Li for use in the Li reduction reaction, leading to production of lithium fluoride (LiF). Thus, the purity of the recovered Co will be degraded, making it difficult to perform magnetic separation for Co.

The difficulty of the magnetic separation for Co caused by the production of LiF can be described as follows. Namely, when LiF is produced, metal powder, such as Co powder, Cu powder and the like, is incorporated into its matrix. Therefore, it will be difficult to discriminate the Cu powder, Al powder and the like from the Co powder that could be otherwise magnetically separated in nature.

Because the lithium cobaltate powder is molded together with the fluororesin binder (PVdF) in the positive electrode of the lithium secondary battery, oxygen and moisture necessary for decomposing, burning and removing the PVdF will not be sufficiently contacted with the binder binding particles of lithium cobaltate together, in an ordinary combustion process. Therefore, the PVdF cannot be completely removed, thus producing the LiF matrix through the reaction between Li used for the reducing reaction in the main process and F contained in the PVdF.

To address this problem, upon recovering the valuable substances, such as Co, Li and the like, from the lithium secondary battery by using the Li—LiCl process as the main process, it is necessary to remove the Al foil, carbon fine particles and fluororesin binder, as much as possible, in the pre-treatment step prior to the main process.

Additionally, in the case of using the Li—LiCl process as the main process, it should be noted that the molten salt (LiCl) is likely to be associated with and/or attached to the recovered Co. Furthermore, there is a possibility that LiF may be incorporated in the recovered Co.

Accordingly, upon recovering the valuable substances, such as Co, Li and the like, from the lithium secondary battery by using the Li—LiCl process as the main process, it is necessary, for a post-treatment step in succession to the main process, to remove the molten salt (LiCl) that may be associated with and/or attached to the recovered Co, as much as possible, as well as to remove LiF, as much as possible, in order to enhance the purity of the recovered Co.

As the pre-treatment process in the conventional processing method, such as the wet process or the like, which does not employ the Li—LiCl process as the main process, a method of using aqueous inorganic acid (JP 2001-185241 A), a method of using heat separation (JP 10-8150 A), a method of applying thermal impact (JP 10-241750 A), a method of providing heating, crushing and acid dissolution (JP 2003-157913 A, JP 11-97076 A), a method of floating selection (JP 2003-272720 A), a method of providing heating, crushing and halogen gas formation (JP 2005-42189 A, and the like are known. None of these pre-treatment processes can completely solve the problem described above in the case of using the Li—LiCl process as the main process.

DISCLOSURE OF THE INVENTION

The present invention was made in light of the above problems of the prior art, and therefore it is an object thereof to provide the recovery method and the recovery apparatus for the valuable substances, which can appropriately recover the valuable substances from the lithium secondary battery even in the case in which the Li—LiCl process is employed as the main process.

To achieve the above object, the recovery method for recovering the valuable substances from the lithium secondary battery, according to the present invention, comprises: a solvent peeling step of dissolving a resin binder included in the electrode material by immersing the lithium secondary battery that is an object to be processed and has been crushed into a plurality of pieces, into a solvent, so as to peel off the electrode material containing the valuable substances from a metal foil constituting the electrode; a filtering step of filtering a suspension of the electrode material containing the valuable substances and the solvent containing the carbon material of the electrode, the suspension having been obtained by the solvent peeling step, so as to separate and recover the electrode material containing the valuable substances and the carbon material; a heat treatment step of heating the electrode material containing the valuable substances and the carbon material, under an oxidative atmosphere, both materials having been separated and recovered by the filtering step, so as to burn and remove the carbon material; and a reducing reaction step of immersing the electrode material containing the valuable substances and obtained by the heat treatment step into a molten salt of lithium chloride containing metal lithium, so as to perform a reducing reaction of the electrode material containing the valuable substances with the metal lithium.

Preferably, the recovery method further comprises a crushing step of crushing the lithium secondary battery that is the object to be processed into the plurality of pieces prior to the solvent peeling step.

Preferably, the crushing step is carried out by a uniaxial shearing machine, wherein the lithium secondary battery that is the object to be processed is sheared and crushed.

Preferably, in the crushing step, the lithium secondary battery that is the object to be processed is crushed into the pieces each having an approximately 10 to 20 mm square size.

Preferably, the recovery method further comprises a water-dip discharging step of immersing the lithium secondary battery that is the object to be processed, into water, so as to discharge it prior to the crushing step.

Preferably, methyl ethyl ketone is used as the solvent for use in the solvent peeling step.

Preferably, in the solvent peeling step, a solvent peeling process is carried out, with the solvent being stirred and/or being applied with ultrasonic vibration.

Preferably, in the solvent peeling step, the solvent peeling process is carried out, with the solvent being heated within a temperature range lower than its boiling point.

Preferably, the heat treatment step is carried out by using a stirring type combustion furnace.

Preferably, the stirring type combustion furnace is a rotary-kiln type combustion furnace.

Preferably, a heating temperature in the heat treatment step is 750° C. or higher, and a processing time in the same step is approximately one hour.

Preferably, the recovery method further comprises a molten-salt immersing step of immersing a movable perforated processing vessel having a vessel main body, which is filled with the electrode material containing the valuable substances and obtained from the heat treatment step, into the molten salt of lithium chloride stored in a reaction tank, wherein a plurality of through-holes, each adapted for communicating an internal space of the reaction tank with an internal space of the vessel main body containing the electrode material therein, are formed in a vessel wall constituting the vessel main body.

Preferably, the recovery method further comprises a lithium electro-deposition step of electrolyzing the molten salt of lithium chloride in which lithium oxide produced in the reducing reaction step is dissolved, so as to deposit the metal lithium onto a cathode, thereby collecting it.

Preferably, the lithium electro-deposition step is carried out by using a pair of electrodes located in a lithium electro-deposition tank provided separately from the reaction tank in which the reducing reaction step is carried out.

Preferably, the lithium electro-deposition step is carried out by using a pair of electrodes provided in the reaction tank in which the reducing reaction step is carried out.

Preferably, the metal lithium deposited on the cathode then floating to and accumulated on the liquid surface of the molten salt of lithium chloride is discharged through a discharging passage including a discharging port located just above the liquid surface of the molten salt of lithium chloride.

Preferably, in the reducing reaction step, once the metal lithium is consumed by the reducing reaction with the electrode material containing the valuable substances, the metal lithium floating on the liquid surface of the molten salt of lithium chloride will be dissolved and supplied into the molten salt of lithium chloride, so as to keep a chemical equilibrium.

To achieve the above object, the recovery apparatus for recovering the valuable substances from the lithium secondary battery, according to the present invention, comprises: a solvent peeling means adapted for dissolving a resin binder included in the electrode material by immersing the lithium secondary battery that is an object to be processed and has been crushed into a plurality of pieces, into a solvent, so as to peel off the electrode material containing the valuable substances from a metal foil constituting the electrode; a filtering means adapted for filtering a suspension of the electrode material containing the valuable substances and the solvent containing the carbon material of the electrode, the suspension having been obtained by the solvent peeling means, so as to separate and recover the electrode material containing the valuable substances and the carbon material; a heat treatment means adapted for burning the electrode material containing the valuable substances and the carbon material, under an oxidative atmosphere, both materials having been separated and recovered due to the filtering means, so as to burn and remove the carbon material; and a reducing reaction tank adapted for immersing the electrode material containing the valuable substances and obtained due to the heat treatment means into a molten salt of lithium chloride containing metal lithium, so as to perform a reducing reaction of the electrode material containing the valuable substances with the metal lithium.

Preferably, the recovery apparatus further comprises a crushing means adapted for crushing the lithium secondary battery that is the object to be processed into the plurality of pieces prior to a solvent peeling process due to the solvent peeling means.

Preferably, the crushing means is a uniaxial shearing machine.

Preferably, the crushing means is adapted for crushing the lithium secondary battery that is the object to be processed into the pieces each having an approximately 10 to 20 mm square size.

Preferably, the recovery apparatus further comprises a water-dip discharging tank adapted for immersing the lithium secondary battery that is the object to be processed, into water, so as to discharge it prior to a crushing process due to the crushing means.

Preferably, methyl ethyl ketone is used as the solvent for use in the solvent peeling means.

Preferably, the solvent peeling means has a function of stirring the solvent and/or function of applying ultrasonic vibration to the solvent.

Preferably, the solvent peeling means has a function of carrying out a solvent peeling process while heating the solvent within a temperature range lower than its boiling point.

Preferably, the heat treatment means is a stirring type combustion furnace.

Preferably, the stirring type combustion furnace is a rotary-kiln type combustion furnace.

Preferably, the heat treatment means has a function of carrying out such a heat treatment that a heating temperature is 750° C. or higher and a processing time is approximately one hour.

Preferably, the recovery apparatus further comprises a movable perforated processing vessel configured to contain therein the electrode material containing the valuable substances and obtained due to the heat treatment means as well as configured to be immersed into the molten salt of lithium chloride in the reducing reaction tank together with the electrode material contained therein, the perforated processing vessel having a vessel main body configured to be filled with the electrode material, wherein a plurality of through-holes, each adapted for communicating an internal space of the reducing reaction tank with an internal space of the vessel main body containing the electrode material therein, are formed in a vessel wall constituting the vessel main body.

Preferably, the recovery apparatus further comprises a lithium electro-deposition means adapted for electrolyzing the molten salt of lithium chloride in which lithium oxide produced in the reducing reaction in the reducing reaction tank is dissolved, so as to deposit the metal lithium onto a cathode, thereby collecting it.

Preferably, the lithium electro-deposition means includes a lithium electro-deposition tank provided separately from the reducing reaction tank and a pair of electrodes located in the lithium electro-deposition tank.

Preferably, the lithium electro-deposition means includes a pair of electrodes provided in the reducing reaction tank.

Preferably, a partition member adapted for shielding the metal lithium floating on a liquid surface of the molten salt of lithium chloride in the reducing reaction tank, from the anode of the lithium electro-deposition means, is provided in the reducing reaction tank.

Preferably, the recovery apparatus further comprises a discharging passage including a discharging port located just above the liquid surface of the molten salt of lithium chloride, in order to recover the metal lithium deposited onto the anode then floating to and accumulated on the liquid surface of the molten salt of lithium chloride.

Thus, according to the present invention comprising features as described above, the valuable substances can be recovered appropriately from the lithium secondary battery, even in the case in which the Li—LiCl process is employed as the main process.

BRIEF DESCRIPTION OF THE DRAWINGS

FIG. 5 is a diagram enlarging and showing a basket unit constituting the perforated basket assembly shown in FIGS. 4A and 4B, in which FIG. 5(a) is a side view, FIG. 5(b) is a front view, FIG. 5(c) is a top view, and FIG. 5(d) is a bottom view.

FIG. 6 is a diagram enlarging and showing parts constituting together the basket unit shown in FIG. 5, in which FIG. 6(a) is a side view, FIG. 6(b) is a front view, FIG. 6(c) is a top view, and FIG. 6(d) is a bottom view.

BEST MODE FOR CARRYING OUT THE INVENTION

Hereinafter, an embodiment of the recovery method and the recovery apparatus for recovering the valuable substances from the lithium secondary battery according to the present invention will be described with reference to the accompanying drawings.

Figure 1:
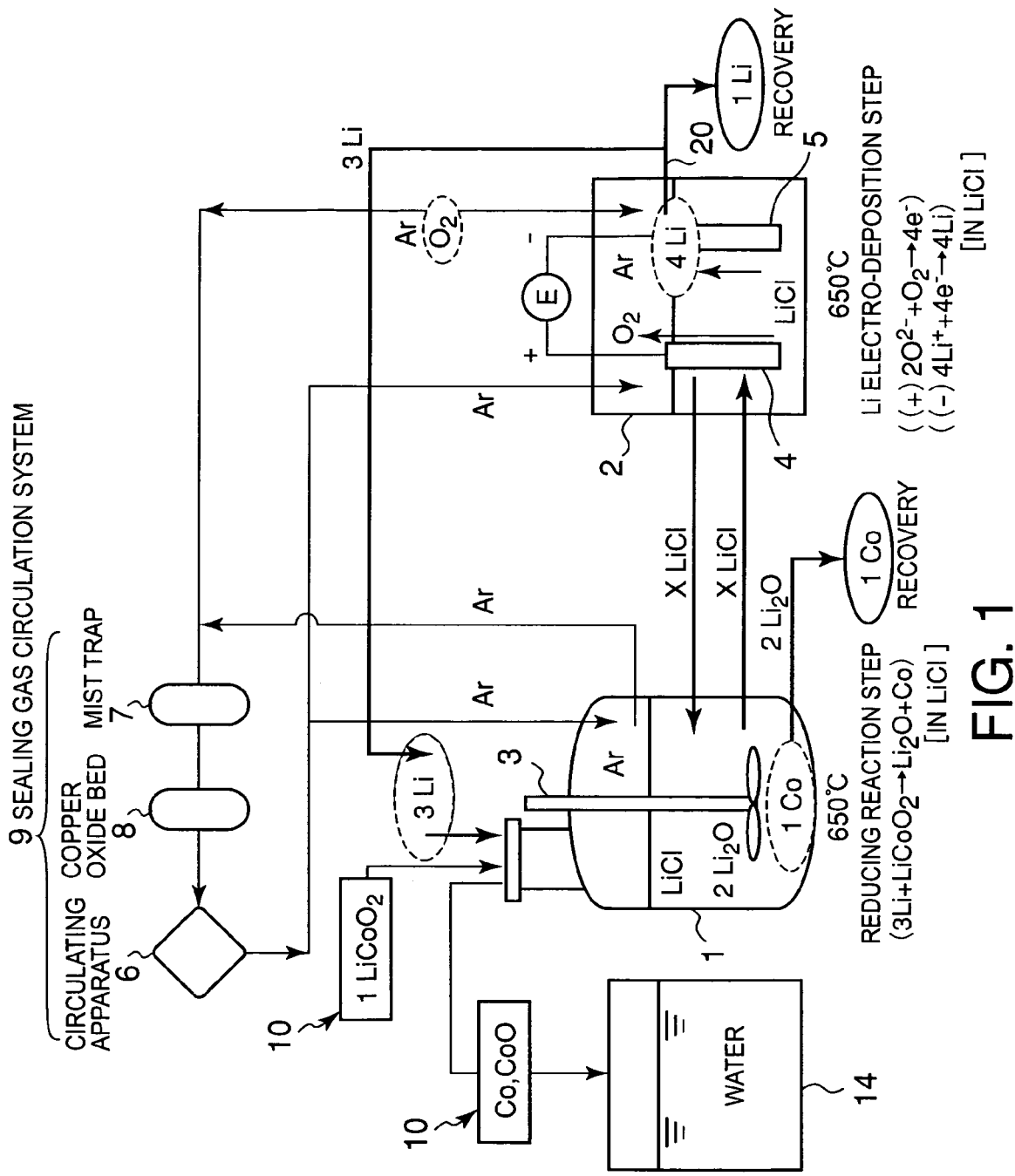
FIG. 1 is a block diagram illustrating construction of equipment for carrying out the main process and the post-treatment steps in the recovery apparatus for recovering the valuable substances from the lithium secondary battery according to an embodiment of the present invention.

As shown in FIG. 1, the valuable-substance recovery apparatus according to this embodiment includes a reducing reaction tank 1 and a lithium electro-deposition tank 2, wherein the Li—LiCl process is carried out as the main process through both of the tanks.

The reducing reaction tank 1 is configured to perform a reducing reaction between lithium cobaltate ($LiCoO_2$) and metal lithium (Li), wherein the lithium cobaltate (LiCoO2) is one example of the electrode material of the lithium secondary battery, and wherein the reducing reaction is performed by immersing the lithium cobaltate in molten lithium chloride, i.e., molten salt of lithium chloride (LiCl), containing the metal lithium (Li). In the reducing reaction tank 1, a stirrer 3 is provided for stirring a liquid in the tank. Since a reducing agent (i.e., Li) and a reduction product ($Li_2O$) can be dissolved in the molten lithium chloride (LiCl), the reducing reaction can be performed homogenously and stably.

The lithium electro-deposition tank 2 is configured to electrolyze lithium oxide produced in the molten lithium chloride in the reducing reaction tank 1 and deposit the metal lithium onto a cathode. In the lithium electro-deposition tank 2, an anode 4 and the cathode 5 are provided for electrolyzing the lithium oxide in the molten lithium chloride, such that the metal lithium can be deposited onto the cathode 5 due to electrolysis. The metal lithium deposited on the cathode 5 then floats to the surface of the molten lithium chloride, and is accumulated on the liquid surface of the molten lithium chloride.

Since metal lithium reacts with oxygen and nitrogen in the air, the atmosphere of a gaseous phase in each of the reducing reaction tank 1 and lithium electro-deposition tank 2 should be sealed with an inert gas, such as argon gas. The sealing gas is utilized by circulation with a circulating apparatus 6. To the circulating apparatus 6, a mist trap 7 adapted to remove mist of the molten salt carried with the sealing gas and a copper oxide bed 8 adapted to remove oxygen gas generated in the lithium electro-deposition tank 2 are connected, respectively. The circulating apparatus 6, mist trap 7 and copper oxide bed 8 constitute together a sealing gas circulation system 9.

Figure 2:
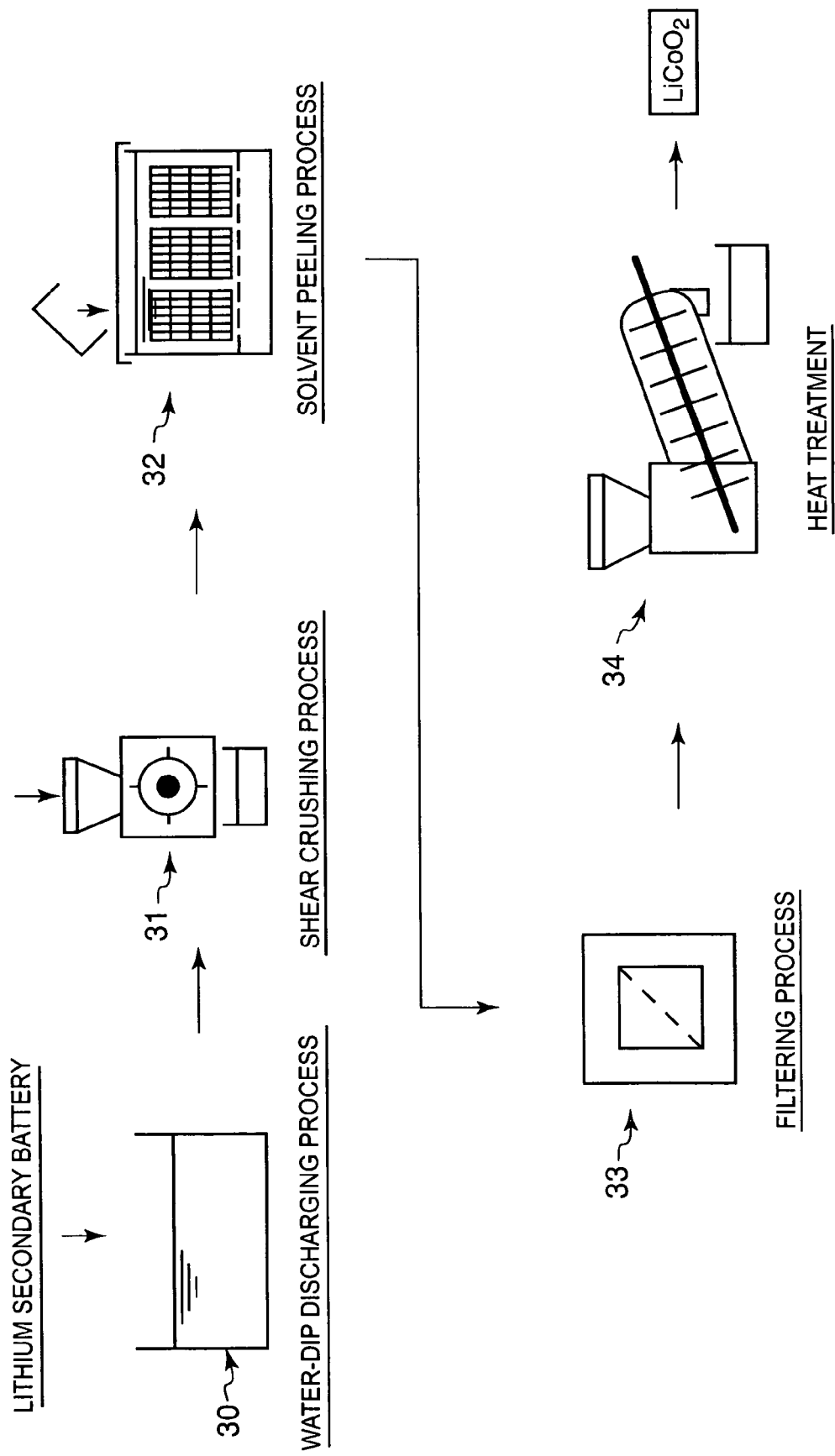
FIG. 2 is a block diagram illustrating construction of equipment for carrying out the pre-treatment steps in the recovery apparatus for recovering the valuable substances from the lithium secondary battery according to an embodiment of the present invention.

In addition, as shown in FIG. 2, the valuable-substance recovery apparatus of this embodiment includes a water-dip discharging tank 30, a shear crushing machine 31, a solvent peeling machine 32, a filtering machine 33, and a heat treatment machine 34, each of these components serving as equipment for constructing a pre-treatment to be carried out prior to the main process.

The water-dip discharging tank 30 is adapted for immersing the lithium secondary battery to be processed into water or salt water so as to discharge the battery. Namely, some disposed batteries are not discharged completely. Therefore, there is a risk that contact of the electrodes with each other during a handling of the process may generate discharge spark that may lead to a fire. To avoid this event, each disposed battery is discharged, by immersing it in electrically conductive water or salt water for about one day, so that safety upon the handling in each later process can be secured.

Figures 14, 15:
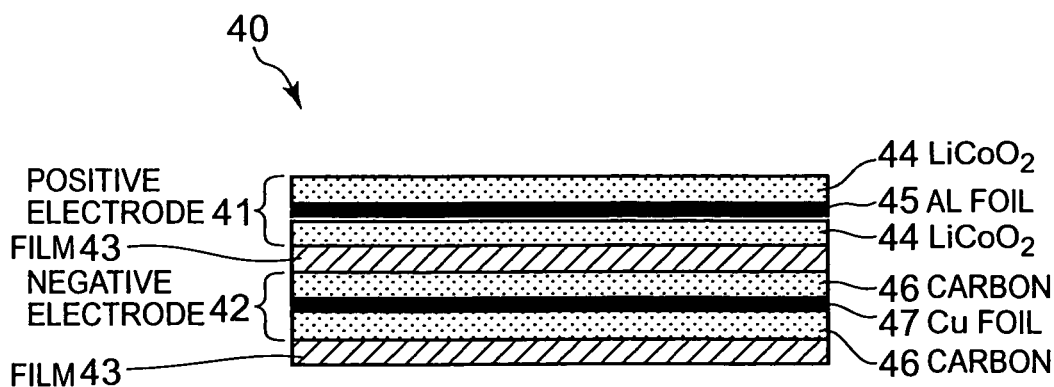
FIG. 14 is a diagram showing an example of components constituting the lithium secondary battery.
FIG. 15 is a diagram showing an example of an electrode structure of the lithium secondary battery.

The shear crushing machine 31 is configured to expose the interior of the lithium secondary battery, by crushing a resin case and a metal case (FIG. 14) of the lithium secondary battery discharged in the water-dip discharging tank 30. Preferably, a uniaxial shearing crusher is used as the crushing machine 31.

The solvent peeling machine 32 is configured to peel off the lithium cobaltate ($LiCoO_2$) powder 44 constituting the positive electrode 41 and the carbon black powder 46 constituting the negative electrode 42, both included in the electrode 40 (FIG. 15) of the lithium secondary battery having been subjected to shear crushing with the shear crushing machine 31, from the Al foil 45 and Cu foil 47, respectively, by dissolving the resin binder (i.e., polyvinylidene fluoride: PVdF) by using a solvent. As the solvent peeling machine 32, it is preferred to use one having a stirring function and/or an ultrasonically vibrating function.

The filtering machine 33 is adapted for separating and recovering the lithium cobaltate ($LiCoO_2$) powder and the carbon black powder from the solvent used in the solvent peeling machine 32. Since the particle size of the lithium cobaltate powder and carbon black powder is approximately several ten microns, the filtering machine 33 should have ability to capture the particles of such a size.

The heat treatment machine 34 is configured to heat the lithium cobaltate ($LiCoO_2$) powder and carbon black powder separated and recovered with the filtering machine 33, in an oxidative atmosphere, then burn and remove the carbon black and associated remaining binder (i.e., polyvinylidene fluoride: PVdF), so as to recover or collect the lithium cobaltate ($LiCoO_2$) powder.

As the heat treatment machine 34, it is preferred to use a stirring-type combustion furnace that can perform a stirring-heating combustion process. For example, a rotary-kiln type or fluidized-bed type heating combustion furnace is known as such a machine. In particular, it is preferred to use the rotary-kiln type heating combustion furnace that can reduce possibility of incorporation or mixing of foreign matter (such as sands or the like) into the collected lithium cobaltate.

For an exhaust gas system of the combustion furnace, it is preferred to provide a hydrofluoric acid removing means thereto, such as a alkali scrubber or the like, taking into account the possibility of generation of hydrofluoric acid due to the combustion. This is because the remaining binder (PVdF) is the fluororesin. In addition, blowing of steam into the combustion furnace may be provided in order to enhance the effect of burning and removing fluorine.

Figure 3:
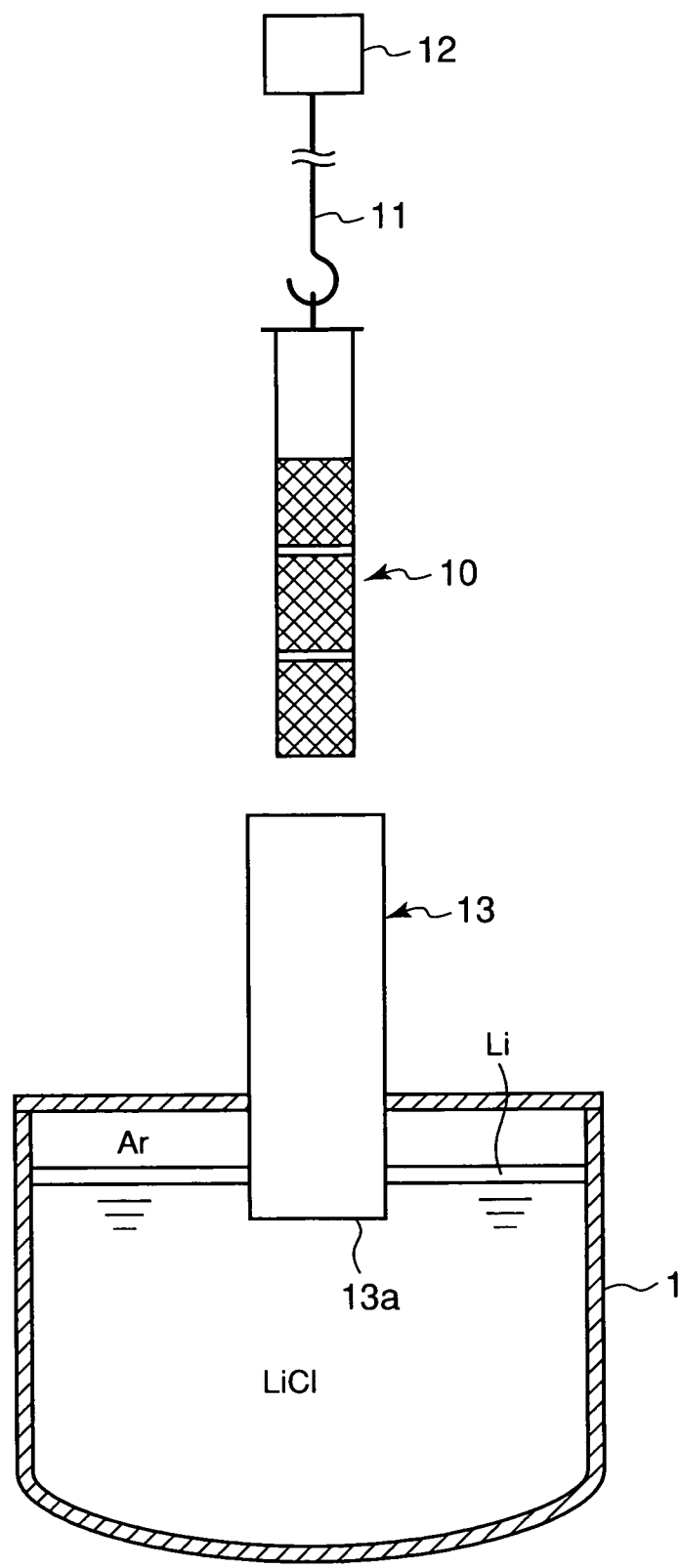
FIG. 3 is a diagram enlarging and showing a key portion of the recovery apparatus for the valuable substances shown in FIG. 1.

As shown in FIG. 3, the valuable-substance recovery apparatus according to this embodiment includes a movable perforated basket assembly 10 (or perforated processing vessel). The movable perforated basket assembly 10 contains therein lithium cobaltate ($LiCoO_2$) that is the electrode material of the lithium secondary battery, and is configured to be immersed into the molten lithium chloride (LiCl) in the reducing reaction tank 1 together with the contained lithium cobaltate.

The perforated basket assembly 10 is carried by a crane 12 (or vessel carrying means) including a hooking or grasping mechanism 11. Namely, the crane 12 is configured to immerse the perforated basket assembly 10 containing the unprocessed lithium cobaltate therein into the molten salt of lithium chloride in the reducing reaction tank 1 as well as configured to pull up the perforated basket assembly 10 from the molten lithium chloride in the reducing reaction tank 1 after a predetermined process has been performed. At this time, an object to be recovered (i.e., cobalt, cobalt oxide or the like) that is a reaction product will remain, as an aggregated mass of powder, in the perforated basket assembly 10.

To the reducing reaction tank 1, a guide tube 13 is provided, in which a passage is formed for allowing the perforated basket assembly 10 to be immersed into the molten lithium chloride in the reducing reaction tank 1 by using the crane 12. The guide tube 13 is arranged such that its lower end 13a is located in a position below the liquid surface of the molten lithium chloride (LiCl) stored in the reducing reaction tank 1.

Additionally, as shown in FIG. 1, the valuable-substance recovery apparatus according to this embodiment includes a water tank 14. Thus, the perforated basket assembly 10 pulled up from the molten lithium chloride in the reducing reaction tank 1 with the crane 12, after having been subjected to the predetermined process in the reducing reaction tank 1, can be immersed into water filled in the water tank 14 in order to wash away extraneous matter attached to the assembly 10 with the water.

Figure 4A:
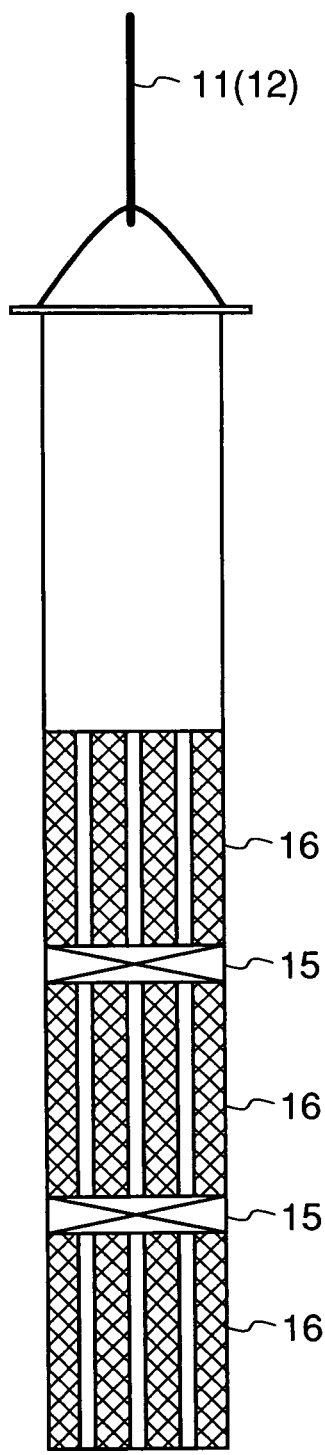
FIG. 4A is a side view enlarging and showing a portion of a perforated basket assembly shown in FIG. 3.
Figure 4B:
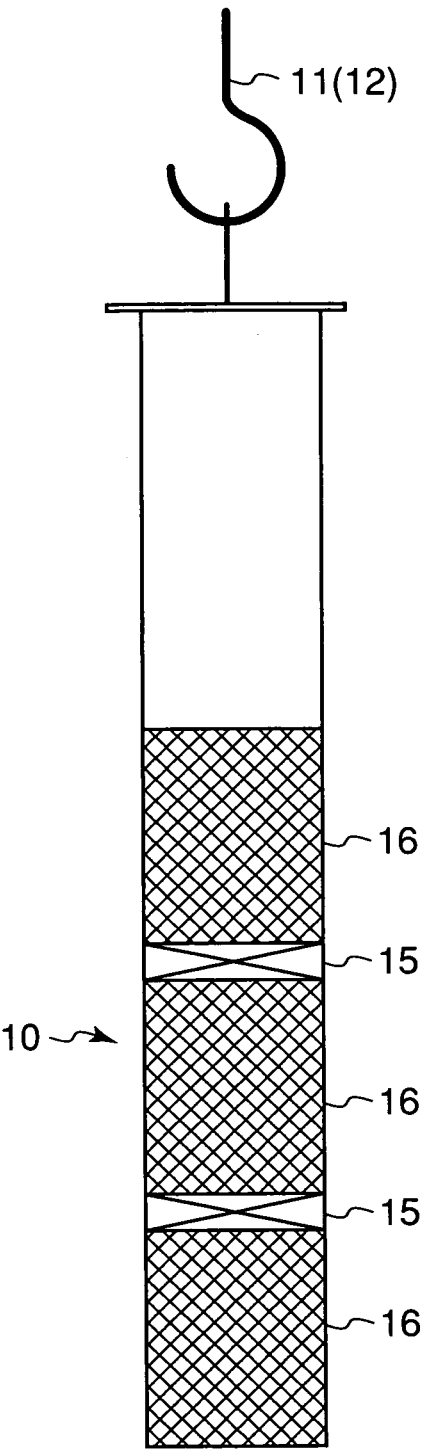
FIG. 4B is a front view enlarging and showing the portion of the perforated basket assembly shown in FIG. 3.
Figure 5:
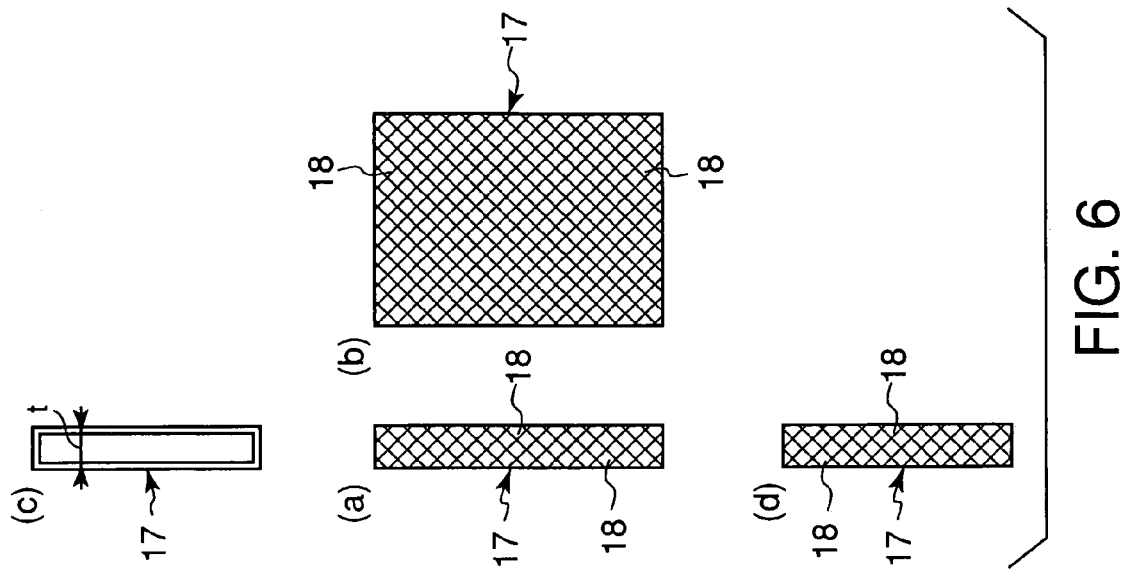

As shown in FIGS. 4A and 4B, the perforated basket assembly 10 is composed of three basket units 16 which are connected vertically with one another via spacers 15, respectively. Each basket unit 16, as shown in FIG. 5, is composed of four perforated baskets (or vessel main bodies) 17 which are connected with one another via a cover plate 18. It should be appreciated that the number (three in this embodiment) of the basket units 16 constituting the perforated basket assembly 10 and the number (four in this embodiment) of the perforated baskets 17 constituting each basket unit 16 may be changed, depending on a desired amount to be processed.

Each perforated basket 17 constitutes a vessel in which lithium cobaltate is filled, and a vessel wall of the perforated basket 17 is formed of a mesh material having a plurality of through-holes 18. In place of using the mesh material, the wall of the perforated basket 17 may be formed from a punching metal. Preferably, the vessel wall of the perforated basket 17 is formed from a material excellent in heat resistance and corrosion resistance, and more preferably, it is formed from a stainless material (e.g., SUS316, or the like).

While, the particle size of lithium cobaltate ($LiCoO_2$) filled in each perforated basket 17 is approximately several ten microns, it was found from our experience that compressed power particles of the lithium cobaltate will not fall out from a screen if each opening thereof is of an about 1 mm size. Accordingly, it is preferred to set the size of each through-hole 18 in the vessel wall of the perforated basket 17 at about 1 mm.

In this manner, in the vessel wall of the each perforated basket 17, the plurality of through-holes 18 are formed throughout the wall. Therefore, once the perforated basket assembly 10 is loaded in the reducing reaction tank 1, an internal space of the reducing reaction tank 1 storing the molten lithium chloride therein is in communication with an internal space of each perforated basket 17 containing lithium cobaltate therein, via the plurality of through-holes 18, throughout the vessel wall of the basket 17.

Figure 6:
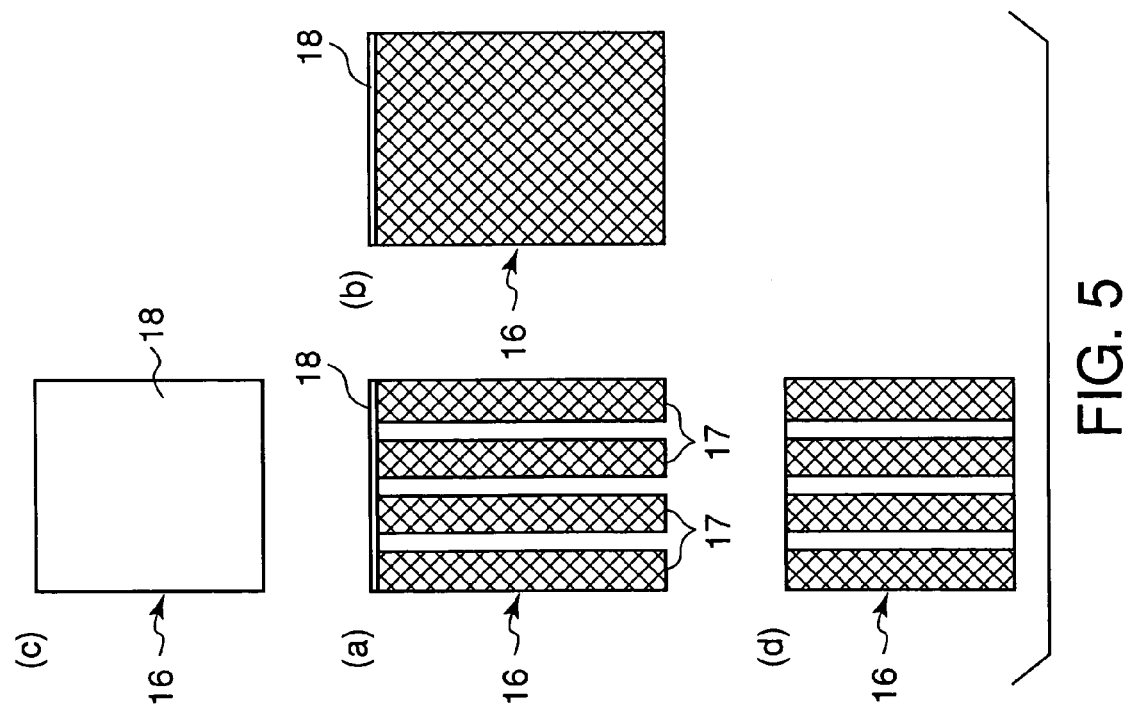

As shown in FIG. 6, each perforated basket 17 has a rectangular structure having an outer shape and an internal space, each having a rectangular horizontal cross section. In the perforated basket 17, a thickness t (FIG. 6(c)) of an internal space in which lithium cobaltate is filled is set approximately twice or less than twice a distance that the molten lithium chloride can permeate into the filled lithium cobaltate. Preferably, the thickness t of the internal space of the perforated basket 17 is within a range of 60 mm or less.

Figure 11A:
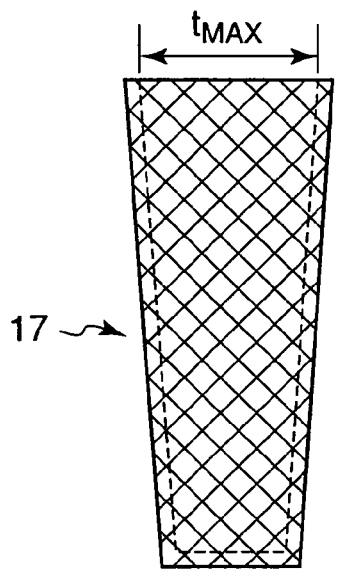
FIG. 11A is a side view showing a preferred example of the perforated basket of the valuable-substance recovery apparatus shown in FIG. 1.
Figure 11B:
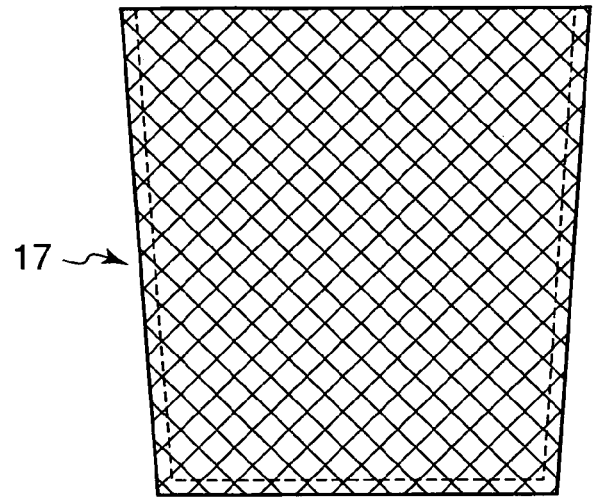
FIG. 11B is a front view of the perforated basket shown in FIG. 11A.

Preferably, as shown in FIGS. 11A and 11B, each perforated basket 17 is of a tapered shape that becomes wider toward its top end opening. In such a tapered perforated basket 17, the thickness of a top portion of the internal space, i.e., the thickness $t_{MAX}$ (FIG. 11) of a portion where the horizontal cross section is the greatest is set approximately twice or less than twice the distance that the molten lithium chloride can permeate into the filled lithium cobaltate.

With such a tapered shape, the mass of the object (cobalt, cobalt oxide and the like) to be recovered, which will remain in each perforated basket 17 after the predetermined process, can be taken out with ease from the perforated basket 17.

Figure 12A:
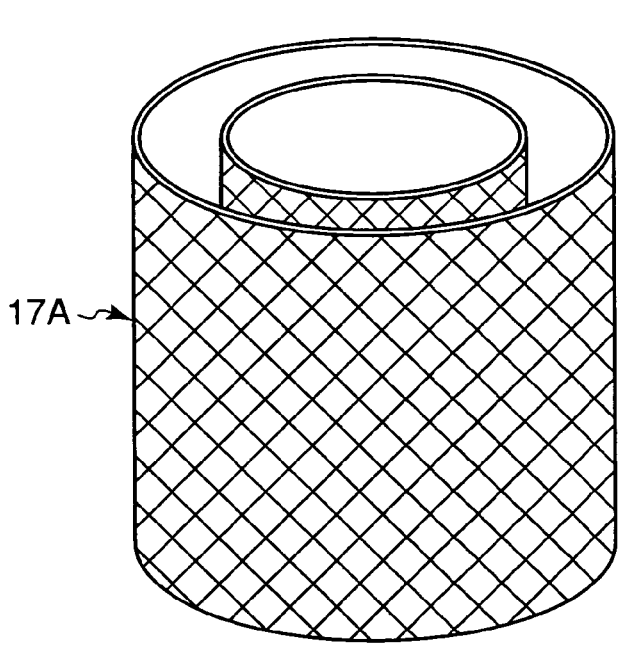
FIG. 12A is a perspective view showing another example of the perforated basket of the valuable-substance recovery apparatus shown in FIG. 1.
Figure 12B:
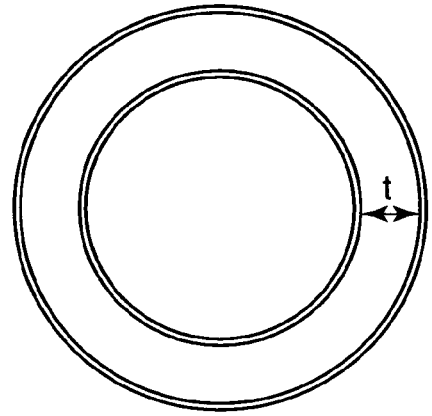
FIG. 12B is a top view of the perforated basket shown in FIG. 12A.
Figure 12C:
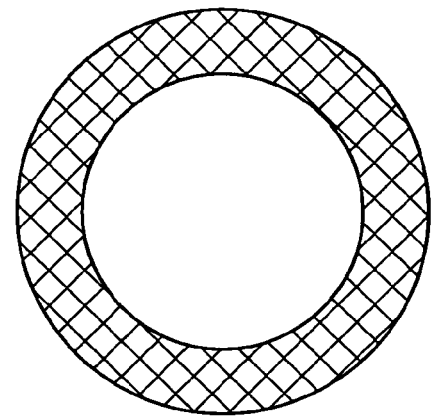
FIG. 12C is a bottom view of the perforated basket shown in FIG. 12A.

As another example of the perforated basket, a perforated basket 17A may also be used, which has a doughnut-like structure including an internal space having an annular horizontal cross section, as shown in FIGS. 12A, 12B and 12C.

In the perforated basket 17 of such a doughnut-like structure, the thickness t between a smaller-diameter inner circumferential wall and a greater-diameter inner circumferential wall defining together the annular internal space is set approximately twice or less than twice the distance that the molten lithium chloride can permeate into the filled lithium cobaltate.

Next, the valuable-substance recovery method for recovering the valuable substances from the used lithium secondary batteries by using the valuable-substance recovery apparatus according to the present invention will be described.

Figure 7:
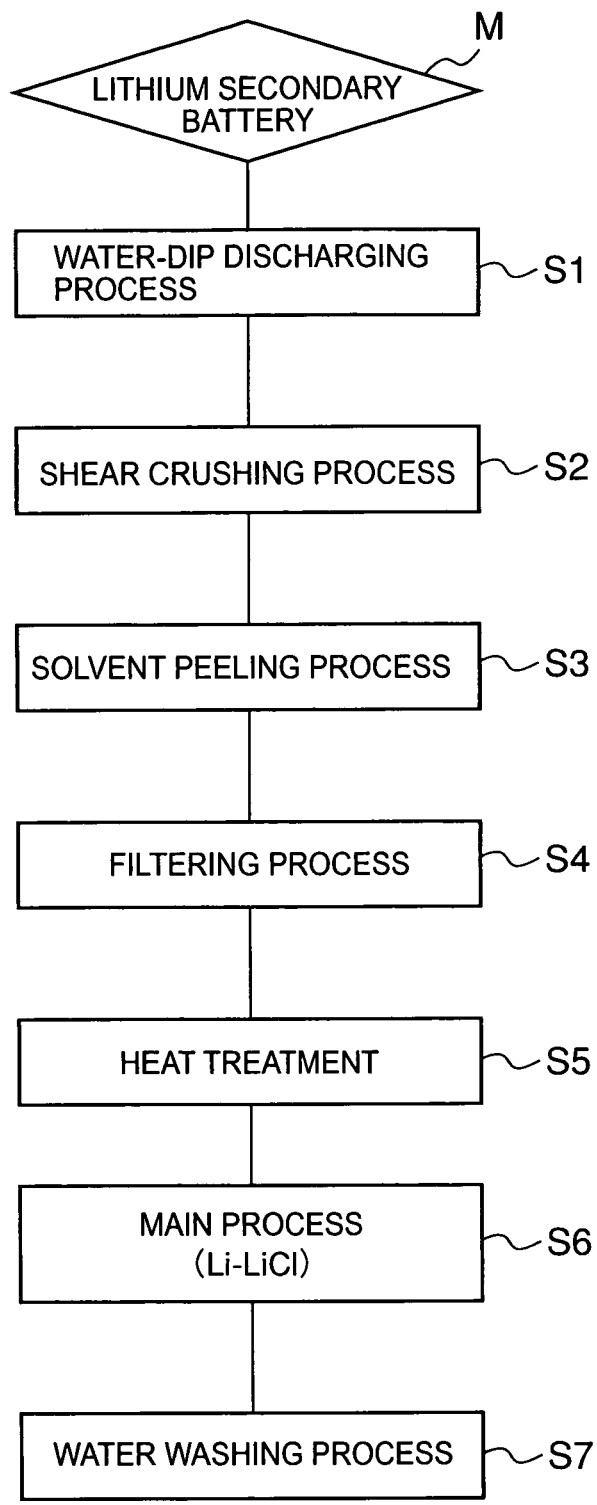
FIG. 7 is a flow chart showing the recovery method for recovering the valuable substances from the lithium secondary battery according to an embodiment of the present invention.

As shown in FIG. 7, as the pre-treatment step, lithium ion batteries M collected in advance are immersed into water in the water-dip discharging tank 30 (Water-dip discharging step S1). In order to ensure safety upon handling in each later process, the disposed batteries are discharged by immersing them into electrically conductive water or salt water for about one day.

In a following shear crushing step S2, there is possibility that an organic solvent will be volatilized when each battery is crushed and the interior thereof is exposed. This is because the battery commonly contains the organic solvent. Therefore, a spark may occur due to contact of metals upon the crushing. Also from this point, wetting of the disposed batteries in the water-dip discharging tank 30 is effective for avoiding such a risk.

Subsequently, the lithium secondary batteries processed in the water-dip discharging tank 30 are carried into the shear crushing machine 31, so as to be subjected to the shear crushing step S2. In a next solvent peeling step S3, a solvent peeling process is applied to the electrode portion 40 constituting the interior of each battery. Therefore, prior to the solvent peeling step S3, it is necessary that the resin case and the metal case (see FIG. 14) of each battery are crushed by the shear crushing machine 31 so as to expose the interior of the battery.

If each piece obtained by the shear crushing step has a 10 to 20 mm square shape, smooth solvent peeling can be carried out in the solvent peeling step S3. As the crushing machine suitable for crushing each battery into such a crushed shape in order to expose its interior, the uniaxial crushing machine can be mentioned.

Thereafter, the crushed pieces of the lithium batteries subjected to the shear crushing process with the shear crushing machine 31 are all put into the baskets and then processed by the solvent peeling machine 32 (Solvent peeling step S3). A main object of the solvent peeling step S3 is applied to the solvent peeling process to the electrode portion 40 constituting the interior of each battery.

Namely, for the positive electrode 41 of each electrode portion 40, in which the Al foil 45 and the lithium cobaltate ($LiCoO_2$) powder 44 are molded and adhered together with the resin binder (i.e., polyvinylidene fluoride: PVdF), the lithium cobaltate powder 44 is peeled off and separated from the Al foil 45 by eliminating the adhesiveness of the resin binder by dissolving the resin binder with a solvent.

Similarly, also for the negative electrode 42 of each electrode portion 40, in which the Cu foil 47 and the carbon black powder 46 are adhered together with the resin binder, the carbon black powder 46 is peeled off and separated from the Cu foil 47 by dissolving the resin binder with the solvent.

In the solvent peeling step S3, it is preferred that the solvent peeling process is carried out with ultrasonic vibration applied to the solvent. Additionally, in the solvent peeling process, the temperature of the solvent may be elevated within a temperature range lower than the boiling point of the solvent.

As the solvent suitable for the solvent peeling step S3, methyl ethyl ketone, N-methyl pyrrolidone and the like can be mentioned. In particular, methyl ethyl ketone is advantageous because of its relatively low price.

Once the binder is dissolved in the solvent, the lithium cobaltate powder and the carbon black powder both peeled off with the solvent are suspended or precipitated in the solvent through the openings of each basket containing the crushed pieces of the disposed batteries therein. Thereafter, the lithium cobaltate powder and the carbon black powder remaining in the solvent peeling tank together with the solvent are stirred into a suspension and then transferred into the filtering machine 33 of a following stage.

Since the solvent (i.e., methyl ethyl ketone), lithium cobaltate powder and carbon black powder are formed together into the suspension, the lithium cobaltate powder and carbon black powder are separated and recovered from the solvent by using a filter of the filtering machine 33 (Filtering step S4). Thereafter, the solvent processed in the filtering machine 33 will be reused in the solvent peeling step S3.

Subsequently, the lithium cobaltate and the carbon black powder (including the associated remaining binder) separated and recovered in the filtering step S4 are carried into the heat treatment machine 34, in which the carbon black powder and the associated remaining binder (i.e., polyvinylidene fluoride: PVdF) are burned and removed with heating in the oxidative atmosphere (or in the air), so as to recover the lithium cobaltate (LiCoO$_2$) powder (Heat treatment step S5). As the heating condition, for example, heating with stirring at a temperature of 750° C. or higher for about one hour can be mentioned.

Thereafter, the lithium cobaltate recovered by using the heat treatment machine 34 is carried into the reducing reaction tank 1 for carrying out the main process S6 comprised of the Li—LiCl process.

Figure 8:
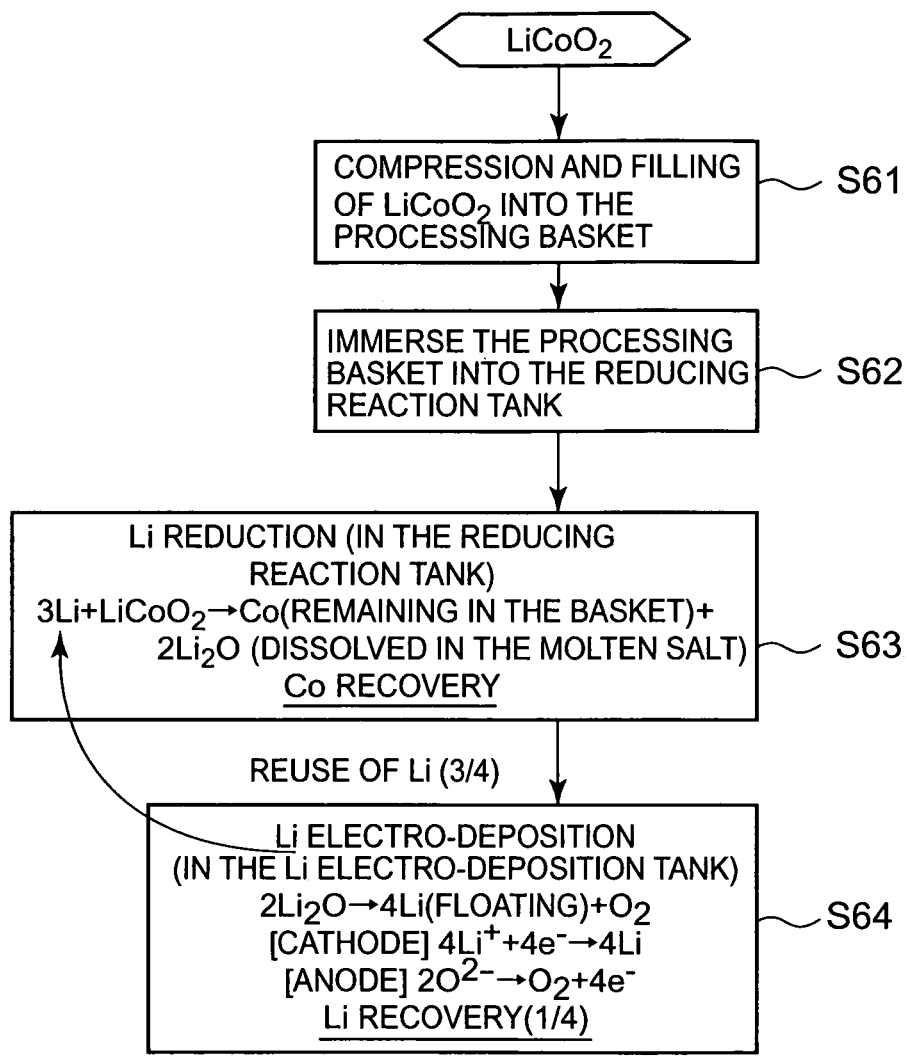
FIG. 8 is a flow chart showing the main process of the recovery method for recovering the valuable substances from the lithium secondary battery according to an embodiment of the present invention.

Specifically, as shown in FIG. 8, the lithium cobaltate (LiCoO$_2$) powder separated and recovered in the above process is compressed and filled into each perforated basket 17 of the perforated basket assembly 10 (Filling step S61).

Figure 9C:
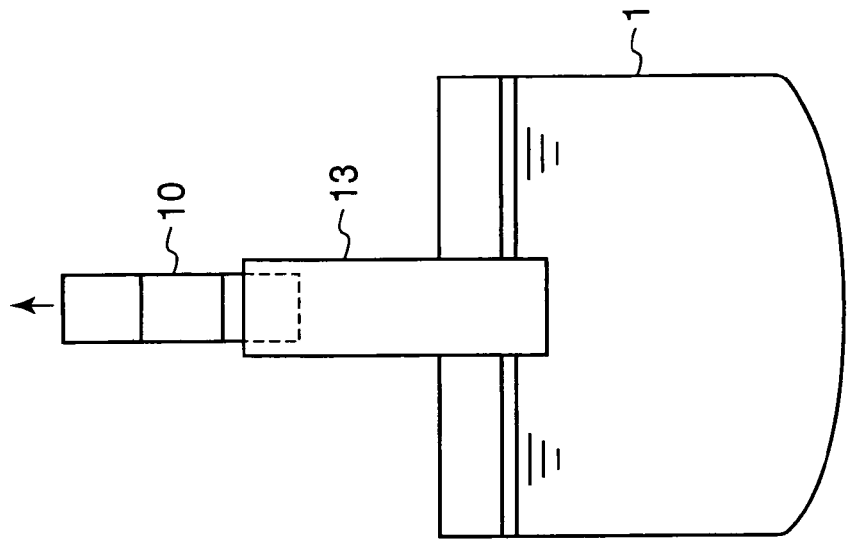
FIG. 9C is a diagram illustrating an aspect of pulling up the perforated basket assembly from the reducing reaction tank of the valuable-substance recovery apparatus shown in FIG. 1.
Figure 9B:
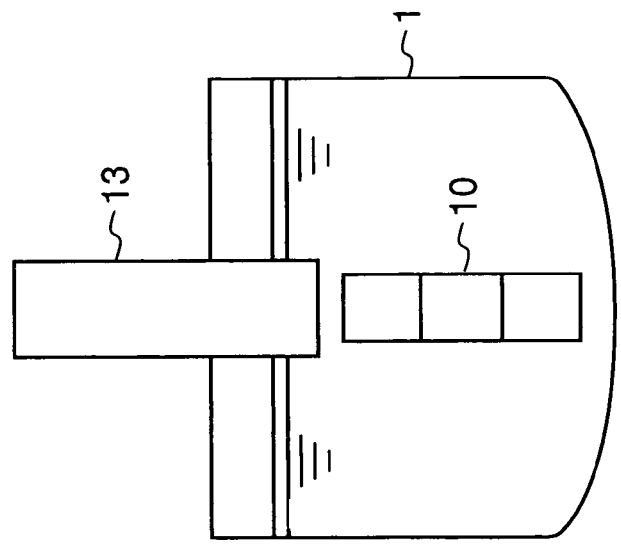
FIG. 9B is a diagram illustrating a state in which the perforated basket assembly is loaded in the reducing reaction tank of the valuable-substance recovery apparatus shown in FIG. 1.
Figure 9A:
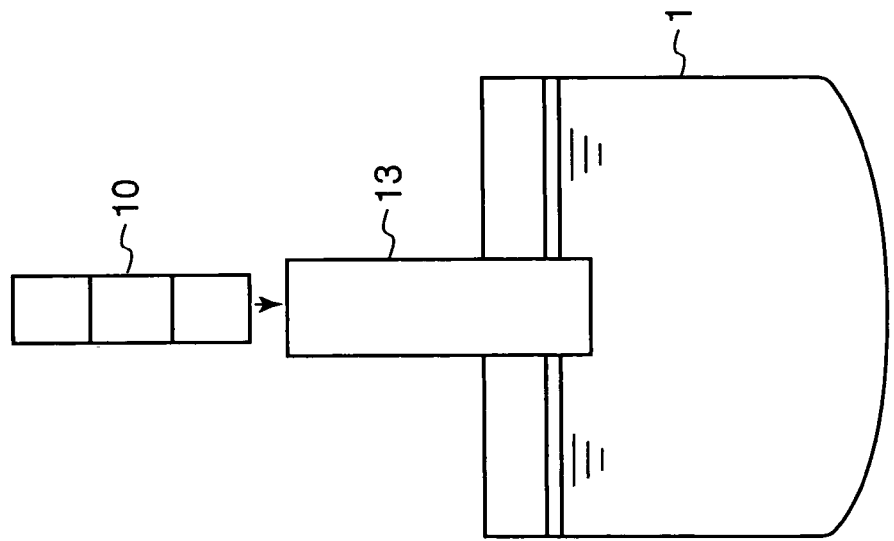
FIG. 9A is a diagram illustrating an aspect of putting the perforated basket assembly into a reducing reaction tank of the valuable-substance recovery apparatus shown in FIG. 1.

Subsequently, as shown in FIG. 9A, the perforated basket assembly 10 composed of the plurality of perforated baskets 17, in which the lithium cobaltate is filled, is loaded in the reducing reaction tank 1 by using the crane 12 through the guide tube 13 (Immersing step S62). In this case, lithium chloride (LiCl) in the reducing reaction tank 1 is heated up to a temperature slightly higher than its melting point (i.e., 610° C.) so as to be kept in a melted state.

As described above, a great number of through-holes 18 are formed in the vessel wall of each perforated basket 17. Therefore, as shown in FIG. 9B, once the perforated basket assembly 10 is loaded in the reducing reaction tank 1, the molten salt of lithium chloride (LiCl), in which the reducing agent Li is dissolved, can flow into each perforated basket 17 via the through-holes 18 and permeate into lithium cobaltate.

As described above, since the thickness t of the internal space of each perforated basket 17 is set twice or less than twice the distance that the molten lithium chloride can permeate into the filled lithium cobaltate, the molten lithium chloride can permeate throughout the lithium cobaltate filled in the perforated basket 17.

Consequently, the reducing reaction with the metal lithium can be performed throughout the lithium cobaltate in each perforated basket 17 in the reducing reaction tank 1 (Reducing reaction step S63). In the reducing reaction step S63, the molten lithium chloride (LiCl), in which metal lithium (Li), i.e., the reducing agent, and lithium oxide (Li$_2$O), i.e., the reaction product, are dissolved, can flow through the plurality of through-holes 18 of each perforated basket 17.

The lithium reducing reaction (S63) shown in FIG. 8 produces cobalt (Co) and lithium oxide (Li$_2$O), based on the following reaction formula, wherein three equivalents of metal lithium (Li) is added to one equivalent of lithium cobaltate (LiCoO$_2$).

$$LiCoO_2 + 3Li \rightarrow Co + 2Li_2O \tag{1}$$

the metal lithium floats on the liquid surface of the molten lithium chloride in the lithium reducing reaction step (S63), it is dissolved therein about 0.1 wt % at 650° C. Therefore, the dissolved lithium that is consumed in the above chemical reaction can be directly supplied from the metal lithium floating on the liquid surface of the molten salt. Thus, the chemical reaction can be automatically continued until the lithium cobaltate and/or metal lithium disappears.

The cobalt (Co) produced by the reducing reaction is not likely to be dissolved in the molten salt of lithium chloride (LiCl), and the lithium cobaltate filled in each perforated basket 17 will substantially keep its original shape even after the reducing reaction (i.e., an exothermic reaction) occurred throughout the whole body. On the other hand, the lithium oxide can be dissolved in the molten salt of lithium chloride about 8.8 wt % at 650° C. Therefore, the lithium oxide dissolved in the molten lithium chloride can be readily separated from the cobalt remaining in each basket 17.

The amount of lithium cobaltate that can be processed for one batch is restricted by an amount of dissolution of the lithium oxide and depends on an amount of the molten lithium chloride and solubility of the lithium oxide.

Once the predetermined reducing reaction step (S63) is completed, the perforated basket assembly 10 is pulled up from the reducing reaction tank 1, together with the recovered object (i.e., cobalt components) remaining in the basket assembly 10, by using the crane 12, as shown in FIG. 9C.

Subsequently, the perforated basket assembly 10 is immersed into the water in the water tank 1 shown in FIG. 1, by using the crane 12, in order to remove the extraneous matter, such as an associated salt or the like (Water washing step S7 of FIG. 7). For example, the molten lithium chloride (LiCl) is associated with the perforated basket assembly 10 when the cobalt components to be recovered are pulled up from the reducing reaction tank 1 together with the perforated basket 10.

In addition, the carbon components and the remaining binder (i.e., the fluororesin) that cannot be removed completely in the heat treatment step S5 may produce LiC (i.e., C+Li→LiC) and LiF (i.e., F+Li→LiF), respectively, in the reaction with the metal lithium (Li) in the reducing reaction tank 1. With the water washing provided to the perforated basket assembly 10 in the water tank 14 by the water washing step (S7), the associated lithium chloride (LiCl) can be dissolved and removed into the water, LiC can also be removed because it will be reacted with the water and produce acetylene, and LiF can also be dissolved and removed into the water.

In the case of utilizing the recovered cobalt components for a raw material of the electrode material, it is sometimes more advantageous for processing to recover or collect them in the form of cobalt oxide. In such a case, lithium oxide and cobalt oxide can be obtained by the following reducing reaction, wherein substantially the same equivalent amount of metal lithium is added to lithium cobaltate.

$$LiCoO_2 + Li \rightarrow CoO + Li_2O \tag{2}$$

In this case, the obtained cobalt oxide is not dissolved in the molten lithium chloride either, and will thus remain in each perforated basket 17.

Once lithium oxide produced by the reducing reaction in the reducing reaction tank 1 is substantially saturated relative to the lithium chloride in the reducing reaction tank 1, the molten lithium chloride, in which the saturated lithium oxide is dissolved, is transferred into the lithium electro-deposition tank 2, so as to carry out a lithium electro-deposition step (S64).

In the lithium electro-deposition tank 2, the anode 4 and the cathode 5 each used for the electrolysis are inserted, and a direct current power source is connected across these electrodes 4, 5. After the molten lithium chloride containing the lithium oxide produced in the reducing reaction tank 1 is transferred into the lithium electro-deposition tank 2, the electrodes 4, 5 are immersed into the molten salt, and a potential difference within a range of from 2.47 to 3.46V is applied between these electrodes 4, 5. Consequently, the electrolysis of lithium oxide occurs, depositing metal lithium onto the cathode while generating oxygen gas around the anode 4.

The metal lithium deposited on the cathode 5 then floats to the surface of the molten salt and accumulated thereon in a melted state. Thus, the floating metal lithium can be collected by flowing or drawing it out of the lithium electro-deposition tank 2 through a discharging tube (or discharging passage) 20 connected with the lithium electro-deposition tank 2 in a position just above the liquid surface of the molten salt in the lithium electro-deposition tank 2.

Meanwhile, the oxygen gas produced will also float to the liquid surface of the molten salt and will be discharged together with the sealing gas.

When the electrolyzing voltage becomes higher than 2.47V, the lithium oxide will be decomposed into the metal lithium and the oxygen gas. However, if the voltage is raised higher than 3.46V, chlorine gas will be generated by decomposition of lithium chloride. Therefore, with adjustment of the electrolyzing voltage within the range of from about 2.47V to 3.46V, the generation of the undesirable chlorine gas can be restricted, thereby providing highly selective decomposition of lithium oxide.

In the case of supplying lithium used for the reducing reaction from the produced metal lithium, approximately three fourths of metal lithium is returned to the reducing reaction tank 1 from the lithium electro-deposition tank 2, and one fourth of the metal lithium is recovered.

Since efficiency of the electrolysis during the lithium electro-deposition will be degraded if the concentration of dissolved lithium oxide is substantially low in the molten lithium chloride, the process is stopped when the concentration becomes an appropriate level, then the remaining molten salt is returned to the reducing reaction tank 1, and the lithium cobltate, i.e., the raw material, and metal lithium are added again, so as to repeat the reducing reaction.

Next, a procedure (Preparation step) for supplying the molten lithium chloride (LiCl), i.e., the reaction solvent, and the metal lithium (Li), i.e., the reducing agent, into the reducing reaction tank 1 will be described, with reference to FIGS. 10A to 10C.

Figure 10A:
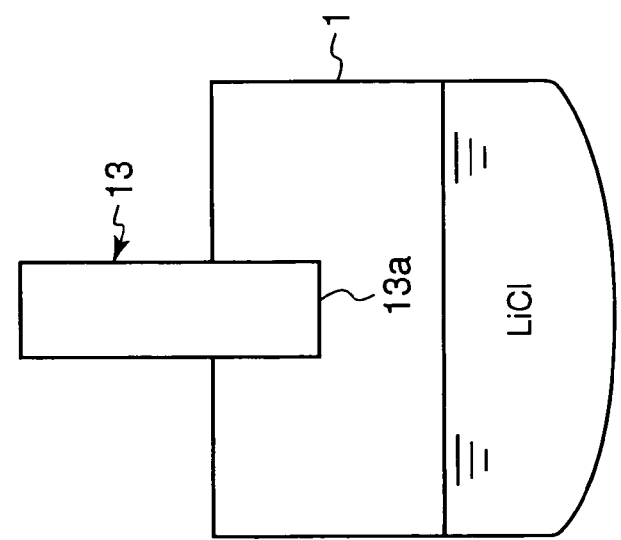
FIG. 10A is a diagram illustrating an aspect of supplying a molten salt of lithium chloride into the reducing reaction tank of the valuable-substance recovery apparatus shown in FIG. 1.
Figure 10B:
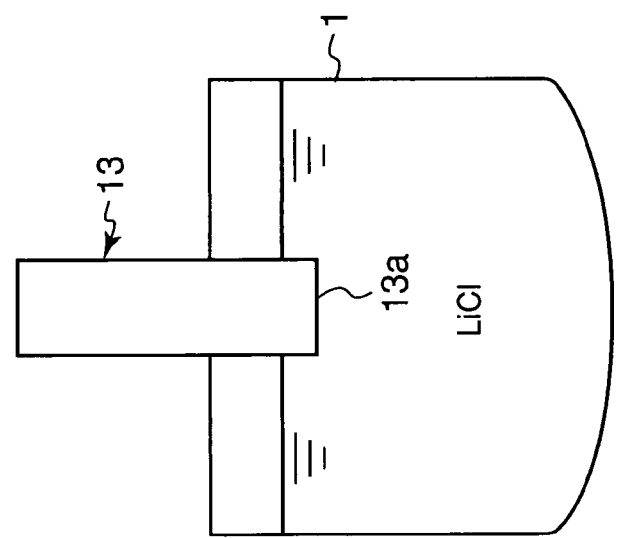
FIG. 10B is a diagram illustrating a state in which the molten salt of lithium chloride is filled up to a predetermined level in the reducing reaction tank of the valuable-substance recovery apparatus shown in FIG. 1.
Figure 10C:
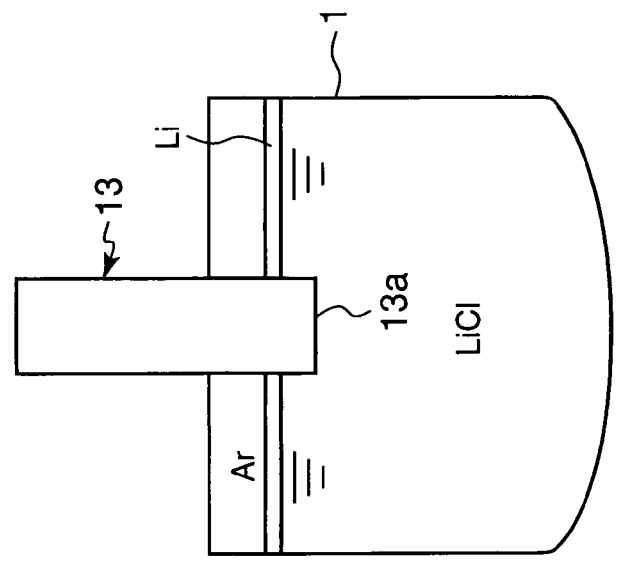
FIG. 10C is a diagram illustrating a state in which metal lithium is supplied onto a liquid surface of the molten salt of lithium chloride filled in the reducing reaction tank of the valuable-substance recovery apparatus shown in FIG. 1.

Prior to the aforementioned immersing step (S62) shown in FIG. 8, only the molten lithium chloride is supplied into the reducing reaction tank 1 as shown in FIG. 10A, and the supply of the material is then stopped when the liquid surface of the molten lithium chloride reaches a point above the bottom end 13a of the guide tube 13 as shown in FIG. 10B. Thereafter, the metal lithium, i.e., the reducing agent, is supplied onto the liquid surface of the molten lithium chloride in the reducing reaction tank 1 outside of the guide tube 13.

This can prevent the metal lithium floating on the liquid surface of the molten lithium chloride from flowing into the guide tube 13. Accordingly, upon pulling up the processed perforated basket assembly 10 from the reducing reaction tank 1 as shown in FIG. 9C, association of the metal lithium with the perforated basket assembly 10 can be avoided. This is effective for preventing the highly reactive metal lithium from contacting with the air.

As described above, according to the recovery method and the recovery apparatus for the valuable substances of this embodiment, the valuable substances contained in the electrode material of each lithium secondary battery can be recovered in a dry process, and especially, the valuable-substance, such as Co or the like, can be recovered or collected adequately with high purity, by implementation of the pre-treatment step and the post-treatment step both suitable for the Li—LiCl process as the main process.

More specifically, incorporation of the relatively valueless AlCo alloy and/or other intermetallic compounds into the recovered Co can be minimized. Besides, the carbon black that will waste the reducing agent Li can be eliminated as much as possible. In addition, the fluororesin binder that will also waste the reducing agent Li can be eliminated as well as incorporation of the impurity LiF into the recovered Co can be minimized. Namely, the impurities LiF, LiC and LiCl that would be otherwise incorporated into the recovered Co can be substantially eliminated, thereby providing the recovered Co product with significantly higher purity.

Furthermore, according to the recovery method and the recovery apparatus for the valuable substances of this embodiment, the object to be processed including lithium cobaltate can be handled, in succession, with the common use of the perforated basket assembly 10, in all of the steps including the charging of the object into the reducing reaction tank 1, the reducing reaction process, and the recovery from the reducing reaction tank 1. Therefore, simplification and compactification of the structure of the valuable-substance recovery apparatus can be achieved, and the working time for recovering the valuable substances can be greatly reduced.

Moreover, according to the recovery method and the recovery apparatus for the valuable substances of this embodiment, lithium that could not be recovered with ease in the past can be securely recovered, in addition to the recovery of cobalt.

Due to the dry process using the molten lithium chloride, the process can be simplified, and the reducing reaction can be uniformly conducted and thus adequately stabilized. Additionally, drainage of water and handling of waste can be facilitated.

Generally, the waste is only the oxygen gas that is generated in the lithium electro-deposition tank 2. In the conventional wet process, many kinds of waste, such as wastewater, ion exchange resins and organic solvents, must be handled. However, in the processing method of this embodiment, only few kinds and amount of waste has to be handled, thus significantly advantageous.

The basic system can be completed by employing the two steps, i.e., the reducing reaction and the electrolysis. As such, the apparatus of this embodiment can be more simplified and compactified, as compared with those requiring a multi-stage cascade process of the conventional method.

Moreover, in the wet process, a means for controlling the amount to be processed or means for cooling the system should be provided in order to prevent boiling of water that is a solvent used for the reducing reaction. In this embodiment, however, since the heat capacity of the molten salt is significantly great while the reaction rate is relatively low, the heat of the reducing reaction can be absorbed adequately, thus enabling a large-scale process.

Figure 13:
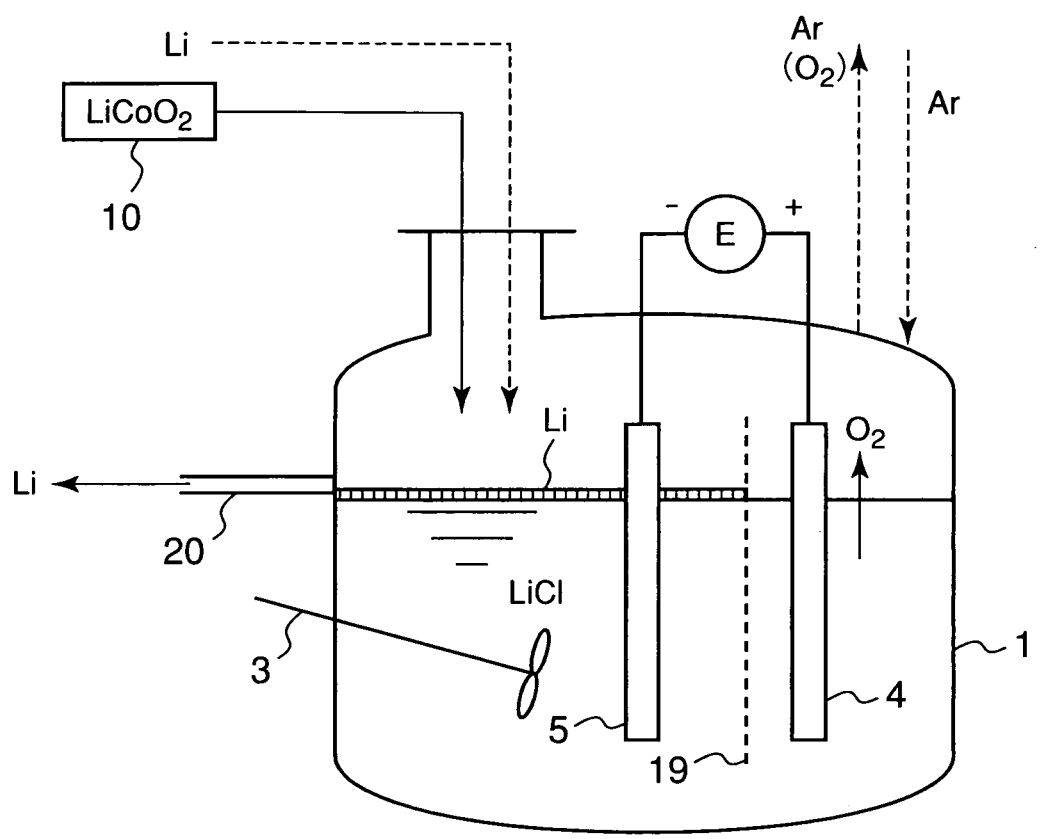
FIG. 13 is a diagram illustrating the recovery apparatus of a single-tank type as a variation of the valuable-substance recovery apparatus shown in FIG. 1.

As a variation of the embodiment described above, a single-tank type system, as shown in FIG. 13, can also be employed. In this system, the electrolyzing electrodes 4, 5 are incorporated together in the reducing reaction tank 1, so that the Li electro-deposition tank and the reducing reaction tank 1 can be used commonly.

In this example, a partition member 19 is provided in the reaction tank 1. The partition member 19 is adapted for shielding the metal lithium floating on the liquid surface of the molten lithium chloride in the reaction tank 1 from the anode 4 of the electro-deposition means, is provided in the reaction tank 1.

Additionally, the discharging pipe 20 adapted for discharging the metal lithium floating on the liquid surface of the molten lithium chloride out of the tank is connected with the reaction tank 1 in a position just above the liquid surface of the molten lithium chloride.

As with the case of this variation, when the reducing reaction tank 1 and the Li electro-deposition tank 1 are provided to be used commonly, a structure for transporting the molten lithium chloride from the reducing reaction tank 1 into the Li electro-deposition tank 2 and the Li electro-deposition tank 2 itself can be omitted. Furthermore, undesirable lowering of the temperature of the molten salt during the transportation can be prevented, as such loss of energy for keeping the temperature of the molten salt can be eliminated.

Since the metal lithium produced in the electro-deposition process can be directly utilized for the reducing reaction, there is no need to provide a separate apparatus for distributing a predetermined amount of the metal lithium into the reducing reaction tank 1 after drawing out it as with the case in which the two tanks are separated.

In the embodiment described above, while the case in which the material of the positive electrode in the lithium secondary battery is lithium cobaltate ($LiCoO_2$) has been discussed, the recovery method and recovery apparatus according to the present invention can also be applied to other materials of the positive electrode than lithium cobaltate, for example, $LiNiO_2$, $LiCo_xNi_{(1-x)}O_2$ (x=1~0), $LiMn_2O_4$ and the like. The chemical reactions in the case of using these materials as the positive electrode material are respectively expressed as follows.

When $LiNiO_2$ is used as the electrode material;

$$LiNiO_2 + 3Li \rightarrow 2Li_2O + Ni, \text{ or}$$

$$LiNiO_2 + Li \rightarrow Li_2O + NiO.$$

Alternatively, when $LiCo_xNi_{(1-x)}O_2$ is used as the electrode material;

$$LiCo_xNi_{(1-x)}O_2 + 3Li \rightarrow 2Li_2O + Co_xNi_{(1-x)}, \text{ or}$$

$$LiCo_xNi_{(1-x)}O_2 + Li \rightarrow Li_2O + Co_xNi_{(1-x)}O.$$

Alternatively, when $LiMn_2O_4$ is used as the electrode material;

$$LiMn_2O_4 + 7Li \rightarrow 4Li_2O + 2Mn, \text{ or}$$

$$LiMn_2O_4 + 3Li \rightarrow 2Li_2O + 2MnO.$$

While preferred examples of the present invention have been shown and described specifically to some extent, it is obvious that various modifications can be made thereto. Accordingly, it should be understood that the present invention can be implemented in various aspects other than those specifically shown and described herein, without departing from the scope and spirit of the claimed invention.

The invention claimed is:

1. A method of recovering a valuable substance from an electrode material of a lithium secondary battery, comprising:
   peeling off the electrode material containing the valuable substance and a resin binder from a metal foil of an electrode of the lithium secondary battery by immersing a plurality of pieces of the lithium secondary battery into a solvent to dissolve the resin binder;
   filtering a suspension of the solvent including the electrode material containing the valuable substance and a carbon material of the electrode obtained by the peeling, so as to separate and recover the electrode material containing the valuable substance and the carbon material;
   heating under an oxidative atmosphere the electrode material containing the valuable substance and the carbon material that has been separated and recovered by the filtering, so as to burn and remove the carbon material from the electrode material; and
   performing a reducing reaction of the electrode material containing the valuable substance by immersing the electrode material containing the valuable substance, which has been obtained by the heating, into a molten salt of lithium chloride containing a lithium metal.

2. The method of recovering the valuable substance from the lithium secondary battery according to claim 1, the method further comprising crushing the lithium secondary battery into the plurality of pieces prior to the peeling.

3. The method of recovering the valuable substance from the lithium secondary battery according to claim 2, wherein the crushing is carried out by a uniaxial shearing machine so that the lithium secondary battery is sheared and crushed.

4. The method of recovering the valuable substance from the lithium secondary battery according to claim 2, wherein the plurality of pieces each have a square size of approximately 10 mm to 20 mm.

5. The method of recovering the valuable substance from the lithium secondary battery according to claim 2, the method further comprising immersing the lithium secondary battery into water to discharge the lithium secondary battery prior to crushing.

6. The method of recovering the valuable substance from the lithium secondary battery according to claim 1, wherein a methyl ethyl ketone is used as the solvent in the peeling.

7. The method of the recovering valuable substance from the lithium secondary battery according to claim 1, wherein the peeling is carried out while the solvent is being stirred and/or applied with ultrasonic vibration.

8. The method of recovering the valuable substance from the lithium secondary battery according to claim 1, wherein the peeling is carried out while the solvent is being heated within a temperature range lower than the solvent's boiling point.

9. The method of recovering the valuable substance from the lithium secondary battery according to claim 1, wherein the heating is carried out using a stirring type combustion furnace.

10. The method of recovering the valuable substance from the lithium secondary battery according to claim 9, wherein the stirring type combustion furnace is a rotary-kiln type combustion furnace.

11. The method of recovering the valuable substance from the lithium secondary battery according to claim 1, wherein the heating is performed at a heating temperature of 750° C. or higher, and a processing time of approximately one hour.

12. The method of recovering the valuable substance from the lithium secondary battery according to claim 1, the method further comprising:
   immersing a movable perforated processing vessel having a vessel main body into the molten salt of the lithium chloride stored in a reaction tank,
   wherein the movable perforated processing vessel is filled with the electrode material containing the valuable substance obtained during the heating, and
   wherein the movable perforated processing vessel has plurality of through-holes in a vessel wall constituted by the vessel main body, each adapted for communicating an internal space of the reaction tank with an internal space of the vessel main body containing the electrode material therein.

13. The method of recovering the valuable substance from the lithium secondary battery according to claim 1, the method further comprising a electrolyzing the molten salt of lithium chloride to dissolve a lithium oxide that was produced in the reducing, so as to deposit the lithium metal onto a cathode, thereby collecting the lithium metal.

14. The method of recovering the valuable substance from the lithium secondary battery according to claim 13, wherein the electrolyzing is carried out using a pair of electrodes located in a lithium electro-deposition tank that is disposed separately from a reaction tank in which the reducing is carried out.

15. The method of recovering the valuable substance from the lithium secondary battery according to claim 13, wherein the electrolyzing is carried out using a pair of electrodes disposed in a reaction tank in which the reducing is carried out.

16. The method of recovering the valuable substance from the lithium secondary battery according to claim 13, wherein the lithium metal deposited on the cathode is floated to and accumulated on a liquid surface of the molten salt of lithium chloride and discharged through a discharging passage including a discharging port located just above the liquid surface of the molten salt of lithium chloride.

17. The recovery method of recovering the valuable substance from the lithium secondary battery according to claim 1, wherein once the lithium metal is consumed by the reducing reaction with the electrode material containing the valuable substance, the lithium metal floating on a liquid surface of the molten salt of lithium chloride will be dissolved and supplied into the molten salt of lithium chloride, so as to maintain a chemical equilibrium.

* * * * *